United States Patent [19]

Gandhi et al.

[11] 4,172,047

[45] Oct. 23, 1979

[54] CATALYST OF RHODIUM ON ALPHA ALUMINA-COATED SUBSTRATE

[75] Inventors: Haren S. Gandhi, Farmington Hills; Mordecai Shelef, Southfield; Hsien C. Yao, Dearborn Heights; Joseph T. Kummer, Ypsilanti; Henryk K. Stepien, Dearborn Heights, all of Mich.

[73] Assignee: Ford Motor Company, Dearborn, Mich.

[21] Appl. No.: 943,591

[22] Filed: Sep. 18, 1978

[51] Int. Cl.$^2$ .......................... B01J 21/04; B01J 23/46
[52] U.S. Cl. ............................ 252/466 PT; 423/213.5
[58] Field of Search ...................... 252/466 PT, 466 B; 423/213.5

[56] References Cited

U.S. PATENT DOCUMENTS

| | | | |
|---|---|---|---|
| 3,118,727 | 1/1964 | Cohn | 423/239 |
| 3,895,093 | 7/1975 | Weidenbach et al. | 252/466 PT |
| 4,006,103 | 2/1977 | Meguerian et al. | 252/472 X |
| 4,020,013 | 4/1977 | Brennan | 252/466 PT |

*Primary Examiner*—W. J. Shine
*Attorney, Agent, or Firm*—William E. Johnson; Keith L. Zerschling

[57] ABSTRACT

A catalyst system is taught for treating exhaust gases from an internal combustion engine. The catalyst system includes a substrate and a wash coat on the substrate. The wash coat is formed substantially of alpha phase alumina. A catalyst is placed on the wash coat consisting of rhodium metal or rhodium metal with another catalyst metal. By using alpha phase alumina as the wash coat, the rhodium is not dissolved into the wash coat during periods when the catalyst system is subjected to high temperature oxidizing conditions.

2 Claims, 2 Drawing Figures

CATALYST OF RHODIUM ON ALPHA ALUMINA-COATED SUBSTRATE

BACKGROUND OF THE INVENTION AND PRIOR ART STATEMENT

Rhodium is an active metal component used in three-way catalyst systems for the reduction of oxides of nitrogen to nitrogen gas. Rhodium is selective in the reduction of oxides of nitrogen by carbon monoxide in the presence of excess oxygen. In a condition where there is not an excess of oxygen, rhodium reduces oxides of nitrogen to nitrogen gas with little formation of ammonia gas.

Rhodium is a by-product of the mining of platinum. On a world-wide basis, normally about 17 units of platinum are mined for each unit of rhodium. Therefore, the rhodium content of any catalyst system must be used effectively and its effectiveness must be maintained during the operative life of the catalyst system.

As reported in the Journal of Catalysis, Volume 50, pages 407 to 418 (December, 1977), in an article entitled "Surface Interaction in the System $Rh/Al_2O_3$", rhodium interacts strongly with gamma alumina, which is normally used as a wash coat material for catalyst systems. Under oxidizing conditions at elevated temperatures, rhodium diffuses into the bulk of the gamma alumina. This diffused and dissolved rhodium is only partly recovered when reducing conditions are once again established over the catalyst system. Thus, exposure of a rhodium containing catalyst system based upon a gamma alumina wash coat to high temperature conditions results in the loss of rhodium as an effective catalyst material over the life of the catalyst system.

It is a particular object of this invention to provide a catalyst system in which rhodium may be employed as a catalyst and the effectiveness of that rhodium is maintained over the life of the catalyst system.

SUMMARY OF THE INVENTION

This invention relates to a catalyst system and, more particularly, to a catalyst system based upon rhodium.

In accordance with the teachings of this invention, a catalyst system is formed as follows. A substrate is selected. A wash coat is applied to the substrate to increase the surface area thereof. The wash coat is formed substantially of alpha phase alumina. A catalyst is placed on the wash coat. This catalyst is a catalyst formed of rhodium or of rhodium and other catalyst metals. The rhodium does not dissolve into alpha phase alumina when the catalyst system is exposed to oxidizing conditions under elevated temperatures.

In accordance with a preferred embodiment of the catalyst system of this invention, the wash coat is applied to the substrate as a gamma phase alumina and is thereafter transformed to alpha phase. The transformation to alpha phase alumina is accomplished by heating the wash coated substrate to a temperature above the gamma to alpha transition temperature. The substrate is maintained at the elevated temperature for a time sufficient to allow the transformation to take place.

DESCRIPTION OF THE PREFERRED EMBODIMENT

Figure 1:
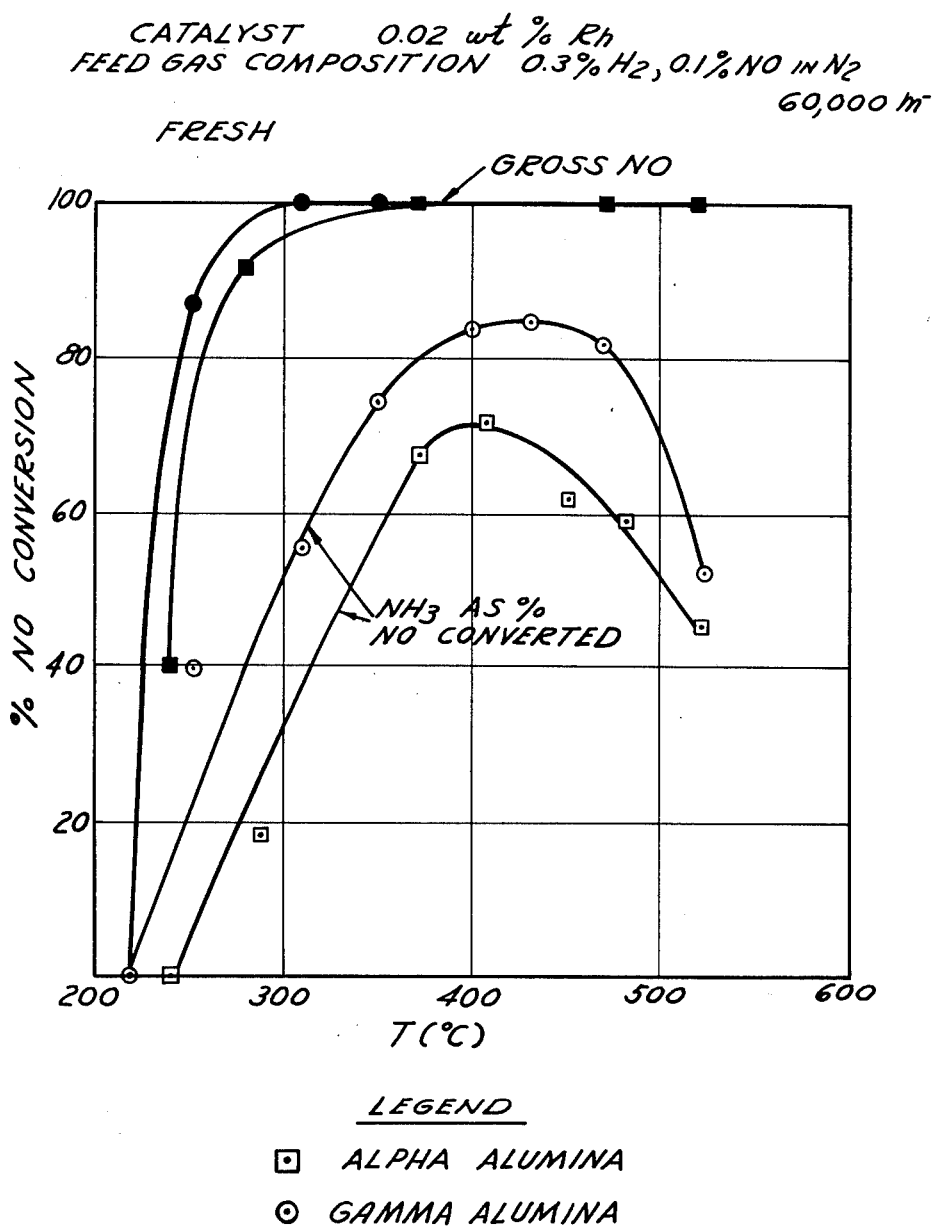
FIG. 1 is a graphical presentation of data which compares two rhodium based catalysts, one on alpha alumina and the other on gamma alumina, in a situation where neither of the catalyst systems has been subjected to an oxygen containing environment for a prolonged period of time at an elevated temperature.

This invention teaches the use of alpha phase alumina as a wash coat material to minimize an interaction between rhodium and alumina and thereby maintain a higher rhodium dispersion on the catalyst system. As previously noted, literature reports that rhodium is dissolved into gamma alumina when a system containing these elements is heated to an elevated temperature in an oxygen environment. By thus dissolving into the gamma alumina, the effectiveness of the rhodium as a catalyst element is reduced. Over the lifetime of such a catalyst system, the catalytic capabilities are seriously decreased by dissolving of the rhodium into a gamma alumina base. We have found that one may substantially reduce this dissolving if the alumina is transformed to its alpha phase, rather than be left as the gamma phase. The transformation may be carried out as follows.

A substrate for the catalyst system is selected. The substrate may be of the general type known, such as a monolithic ceramic substrate, a monolithic metallic substrate, or pelletized catalystic substrate. The substrate is wash coated with a desired amount of gamma alumina, for example, 10 to 15% by weight of the weight of the substrate. The gamma alumina is dried in air at 120° C. and subsequently calcined at a temperature in excess of 1000° C., preferably 1100° C.–1200° C. This heat treatment transforms the gamma alumina to alpha alumina. The period of heat treatment generally will depend upon temperature.

The temperature required for the gamma to alpha transformation depends upon the purity of the alumina. This temperature can be altered by adding materials to the alumina. For example, addition of doping material such as molybdenum oxide and copper oxide reduces the gamma to alpha phase transition temperature to a lower temperature. Additions of silicon dioxide, barium oxide, calcium oxide and lanthanum oxide raise the temperature at which the gamma to alpha transition takes place.

The gamma alumina conversion to alpha alumina is by far the preferred way of developing an alpha alumina wash coat on the substrate. However, one may make the alpha alumina to start with and deposit this material directly on the substrate if desired.

The catalyst material is a rhodium based catalyst. By this we mean that the catalyst is all rhodium or a mixture of rhodium with some other catalyst. For example, one may make a catalyst system based on rhodium and platinum in which the rhodium to platinum ratio is generally one unit of rhodium per 17 units of platinum, which is the mined ratio these materials are obtained in. The rhodium should be applied in a small, but effective, amount. Generally, 0.02% by weight of the substrate is a sufficient amount of rhodium. The rhodium may be present in the range from 0.005% to 0.1% by weight of the substrate.

In order to demonstrate what occurs if a gamma alumina substrate is used, the following example will be described. Two ceramic monoliths were selected. These ceramic monoliths were impregnated with 10% by weight gamma alumina (manufactured as Dispal-M from Continental Oil Company). The wash coated substrates were dried at 120° C. and calcined at 600° C. for four hours in air. One of the two samples was subsequently heat treated at 1150° C. for two hours in air so as to transform the gamma alumina to alpha alumina. The two substrates were then coated with 0.02% rhodium by weight of the substrate. These two samples were then subjected to a mixture of gases to ascertain their ability to transform oxides of nitrogen. The substrates were treated with a gas containing 0.3% hydrogen, 0.1% nitrogen oxide, balance nitrogen gas at a space velocity of 60,000 reciprocal hours.

The rhodium was impregnated onto the substrate from a rhodium nitrate solution in order to obtain the 0.02 weight percent rhodium on each of the substrates. The catalysts were dried in air at 500° C. for four hours. The gamma alumina sample had a surface area of 17.3 square meters per gram, as compared to the more compact alpha phase which had only a 2.6 square meters per gram surface area. However, in both cases the rhodium surface area, as measured by hydrogen titration, corresponded to 0.6 $\mu$mol/g of catalyst. As stated above, the freshly made catalysts were subjected to tests, the results of which are shown in FIG. 1. The activity of the two catalysts in the fresh condition for the NO-hydrogen reaction is similar. However, ammonia formation, shown as ammonia produced based on percentage NO converted, is considerably lower for the alpha alumina supported catalyst than for the gamma alumina catalyst.

Figure 2:
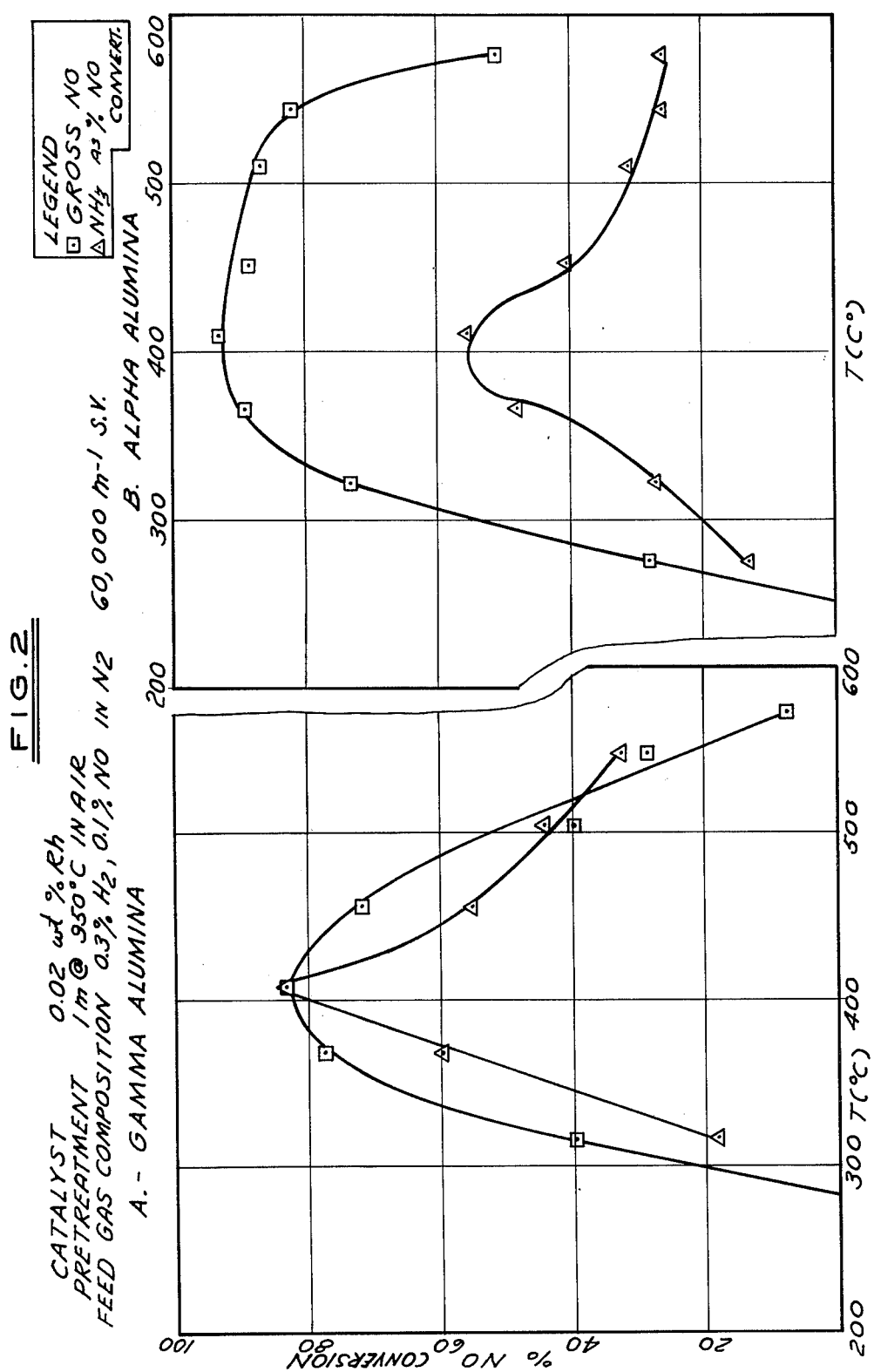
FIG. 2 is a graphical presentation of data obtained from testing the two catalyst of FIG. 1 after each had been treated in air for one hour at 950° C.

Both of the catalyst samples were subsequently heat treated at 950° C. in air for one hour and the NO-hydrogen reaction tests repeated. The results of these tests are shown in FIG. 2. During the heating at this temperature and time, in the case of the gamma alumina wash coat, a certain amount of the rhodium is dissolved into the gamma alumina and is lost. It is clear from FIG. 2 now that the pre-treatment at 950° C. in air has caused significant loss in the activity for the gamma alumina supported sample due to dissolution of rhodium in the gamma alumina. This heating step is related to the real world in that this loss of rhodium usage would occur during various portions of the operation of a catalyst device in a motor vehicle when that device was subjected to high temperature oxidizing conditions, such as cold start with secondary air and lean excursions. This one hour test is representative of frequent high temperature transients of small interval, e.g., 2 to 3 seconds in lean A/F region.

From FIG. 2 it is simple to note that the net NO conversion over alpha alumina is by far superior than that achieved over gamma alumina using a rhodium based catalyst. The rhodium surface area as measured by hydrogen titration confirmed that the rhodium-alpha alumina sample had over ten-fold higher surface area, 0.18 $\mu$mol/gram of catalyst as compared to the rhodium-gamma alumina sample which had 0.015 $\mu$mol/gram of catalyst.

Similar results have been achieved by us with respect to platinum/rhodium catalysts on gamma alumina and alpha alumina, both for the stated NO-$H_2$ reactions and for reactions involving simulated exhaust gas mixtures.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A catalyst system for treating exhaust gases from an internal combustion engine which comprises:
    a substrate;
    a wash coat on said substrate, said wash coat being formed substantially of alpha phase alumina, and
    a catalyst on said wash coat consisting of a catalyst selected from the group consisting of rhodium metal and rhodium metal with other catalyst metals.

2. The catalyst system of claim 1 wherein:
    said wash coat is applied to said substrate as gamma phase alumina and is transformed to alpha phase alumina by being heated to a temperature above the gamma to alpha transition temperature.

* * * * *